United States Patent
Hsu

(10) Patent No.: US 8,213,099 B2
(45) Date of Patent: Jul. 3, 2012

(54) MINIATURE AUTO-FOCUSING LENS DEVICE

(75) Inventor: Chen-Er Hsu, Taoyuan County (TW)

(73) Assignee: TDK Taiwan Corp. (TW)

(*) Notice: Subject to any disclaimer, the term of this patent is extended or adjusted under 35 U.S.C. 154(b) by 44 days.

(21) Appl. No.: 12/655,799

(22) Filed: Jan. 7, 2010

(65) Prior Publication Data

US 2011/0164326 A1    Jul. 7, 2011

(51) Int. Cl.
*G02B 15/14* (2006.01)
*G02B 27/02* (2006.01)
*G02B 7/02* (2006.01)

(52) U.S. Cl. ........ 359/824; 359/691; 359/803; 359/696; 359/829

(58) Field of Classification Search .................. 359/691, 359/694, 696, 716, 819, 822–824, 803, 829
See application file for complete search history.

(56) References Cited

U.S. PATENT DOCUMENTS

| 7,064,912 | B2* | 6/2006 | Yamamoto et al. | 359/824 |
| 7,440,201 | B2* | 10/2008 | Tsuruta et al. | 359/824 |
| 7,702,233 | B2* | 4/2010 | Oh et al. | 359/824 |
| 2006/0061891 | A1* | 3/2006 | Ito et al. | 359/824 |
| 2008/0007850 | A1* | 1/2008 | Huang | 359/824 |
| 2008/0180814 | A1* | 7/2008 | Kawasaki | 359/716 |

* cited by examiner

*Primary Examiner* — Ricky Mack
*Assistant Examiner* — Zachary Wilkes

(57) ABSTRACT

A miniature auto-focusing lens device includes a first casing, a second casing coupled to the first casing, a movable lens set disposed in the first casing, an electromagnetic driving module provided in the first casing and configured to drive the movable lens set to perform focusing and displacement, and a fixed lens set coupled to the second casing and corresponding in position to the movable lens set. The movable lens set and the fixed lens set together form an optical system of the miniature auto-focusing lens device to perform optical focusing and imaging. The fixed lens set includes a lens that outstrips any one of the lenses of the movable lens set in size.

9 Claims, 8 Drawing Sheets

MINIATURE AUTO-FOCUSING LENS DEVICE

BACKGROUND OF INVENTION

1. Field of the Invention

The present invention relates to miniature auto-focusing lens devices, and more particularly, to a lens device which is furnished with a movable lens set and a voice coil motor in order to perform focusing operation.

2. Description of the Prior Art

In recent years, there is a trend toward handheld electronic devices capable of digital-photo shooting and digital-video recording. Handheld electronic devices of this kind are usually compact and operated by light-duty batteries; hence, size and power consumption are two essential factors in designing lens modules for use with the handheld electronic devices.

Digital cameras or digital camcorders, which are solely intended for photo shooting or video recording, can work quite well when equipped with a lens module capable of optical zooming and focusing even though the lens module is bulky. However, those handheld electronic devices whose principal function is not photo shooting or video recording, such as cell phones, notebook computers, or personal digital assistants (PDAs), are allowed with little room for accommodating the lens module. In general, the overall volume of miniature lens modules for use with handheld electronic devices, such as cell phones, notebook computers, or personal digital assistants (PDAs), is always less than 1.5 cm*1.5 cm*1.5 cm (e.g., width*length*height). Owing to the stringent volumetric restriction, nearly all the miniature lens modules are merely capable of optical focusing but seldom capable of both optical focusing and optical zooming. In other words, a conventional optical zooming mechanism for wide use with digital cameras or digital camcorders does not apply to the miniature lens modules, whether the conventional optical zooming mechanism works by an optical means or a mechanical means.

Commercially available miniature lens modules drive a lens to perform auto-focusing mostly by an electromagnetic technique commonly known as VCM (Voice Coil Motor). Referring to FIG. 1, a conventional miniature lens module 9 comprises a casing 91, a lens carrier 92, a plurality of magnets 93, a drive coil 94, a small-size first lens 95, and a large-size second lens 96. The lens carrier 92 is disposed in a receiving space centrally provided in the casing 91. The lens carrier 92 is peripherally provided with the drive coil 94 corresponding in position to the magnets 93 attached to the casing 91 and equidistantly spaced apart. The lens carrier 92 is provided therein with the first lens 95 and the second lens 96 corresponding in position thereto.

The drive coil 94 is supplied with preset electric currents transmitted in different directions to thereby produce electromagnetic fields in different directions. Hence, the magnets 93 fixed to the lens carrier 92 produce repulsive forces or attractive forces under which the lens carrier 92 undergoes axial displacement in the receiving space of the casing 91 such that the first lens 95 and the second lens 96 move synchronously inside the lens carrier 92 to thereby effectuate optical focusing.

The second lens 96 corresponds in position to an image sensing module 81 provided on a substrate 8. For reasons related to optical imaging, the second lens 96 usually outstrips the first lens 95 in area, and both the first lens 95 and the second lens 96 are confined to the lens carrier 92. During a focusing operation, in addition to the lens carrier 92, both the first and second lens 95, 96 are driven by the drive coil 94 and electromagnetic forces produced by the magnets 93. In other words, the total magnitude of the forces required to move the lens carrier 92 is relatively great, and thus the size and weight of the drive coil 94 encircling the lens carrier 92 and the magnets 93 corresponding in position to the drive coil 94 are relatively great. Hence, not only is a large electric current supplied to the conventional miniature lens module 9 in order to generate power sufficient for a focusing operation, but it is impossible to miniaturize the conventional miniature lens module 9. Also, dust and microparticles which are produced by friction in the course of assembly of the conventional miniature lens module 9 or originate from an external source are likely to accumulate in the vicinity of the image sensing module 81 to the detriment of the image quality thereof. Accordingly, there is still room for improvement in the conventional miniature lens module 9.

SUMMARY OF INVENTION

It is an objective of the present invention to provide a miniature auto-focusing lens device which is more compact and power-efficient but has less dust-induced and microparticle-induced impact upon image quality than the prior art.

In order to achieve the aforementioned objective, the present invention discloses a miniature auto-focusing lens device which comprises a first casing, a second casing coupled to the first casing, a movable lens set disposed in the first casing, an electromagnetic driving module provided in the first casing and configured to drive the movable lens set to perform focusing and displacement, and a fixed lens set coupled to the second casing and corresponding in position to the movable lens set. The movable lens set and the fixed lens set together form an optical system of the miniature auto-focusing lens device to perform optical focusing and imaging. The fixed lens set includes a lens that outstrips any one of the lenses of the movable lens set in size.

In a preferred embodiment, the miniature auto-focusing lens device further comprises a lens carrier configured to carry the movable lens set therein and provided, internally and circumferentially, with a plurality of internal threads in screw-engagement with a plurality of external threads circumferentially provided on the movable lens set.

In a preferred embodiment, the movable lens set further comprises a first lens and a second lens positioned between the first lens and the fixed lens set and having a diameter larger than a diameter of the first lens.

In a preferred embodiment, the first casing is peripherally provided with a plurality of fixing frames paired, opposite, and equidistantly spaced apart from each other, and the electromagnetic driving module comprises a plurality of magnets and a drive coil, the magnets being embedded in and fixed to the fixing frames peripherally provided to the first casing, and the drive coil encircling the lens carrier and being separated from the magnets provided inside the fixing frames by a preset gap.

In a preferred embodiment, the second casing is coupled to a circuit board such that the fixed lens set and an image sensing module electrically connected to the circuit board correspond in position to each other and are aligned with the central axis.

In a preferred embodiment, the second casing is provided with a filter disposed between the fixed lens set and the circuit board and corresponding in position to the image sensing module.

In a preferred embodiment, the miniature auto-focusing lens device further comprises:

a lid coupled to the first casing and centrally provided with a through hole corresponding in position to the movable lens set;

a first conductive leaf spring sandwiched between the lid and the first casing; and a second conductive leaf spring sandwiched between the first casing and the second casing, wherein the first and second conductive leaf springs are configured to enable the lens carrier to be resiliently clamped inside the receiving space of the first casing and are electrically connected to the drive coil. Wherein at least two pins extend from the first conductive leaf spring and the second conductive leaf spring, respectively, and serve as inputs for receiving positive and negative electric current.

In a preferred embodiment, the movable lens set includes only one lens, and the fixed lens set includes two lenses, the lenses being mounted on the second casing.

BRIEF DESCRIPTION OF THE DRAWINGS

The structure and technical means adopted by the present invention to achieve the above and other objectives can be best understood by referring to the following detailed description of the preferred embodiments and the accompanying drawings, in which.

DETAILED DESCRIPTION OF PREFERRED EMBODIMENTS

A miniature auto-focusing lens device of the present invention is structurally characterized by an optical system required for imaging such that the optical system comprises two optical lens sets, namely a small movable optical lens set and a large fixed optical lens set. Also, a VCM (Voice Coil Motor) electromagnetic driving module is installed on the small movable optical lens set rather than the large fixed optical lens set. Hence, compared with the prior art, the miniature auto-focusing lens device of the present invention is more compact and is more power-efficient because it takes less power to drive a small optical lens set. Furthermore, the miniature auto-focusing lens device of the present invention is advantageously characterized in that accumulation of dust and microparticles is limited to a large optical lens set rather than an image sensing module to thereby have less impact upon image quality thereof.

Figure 1:
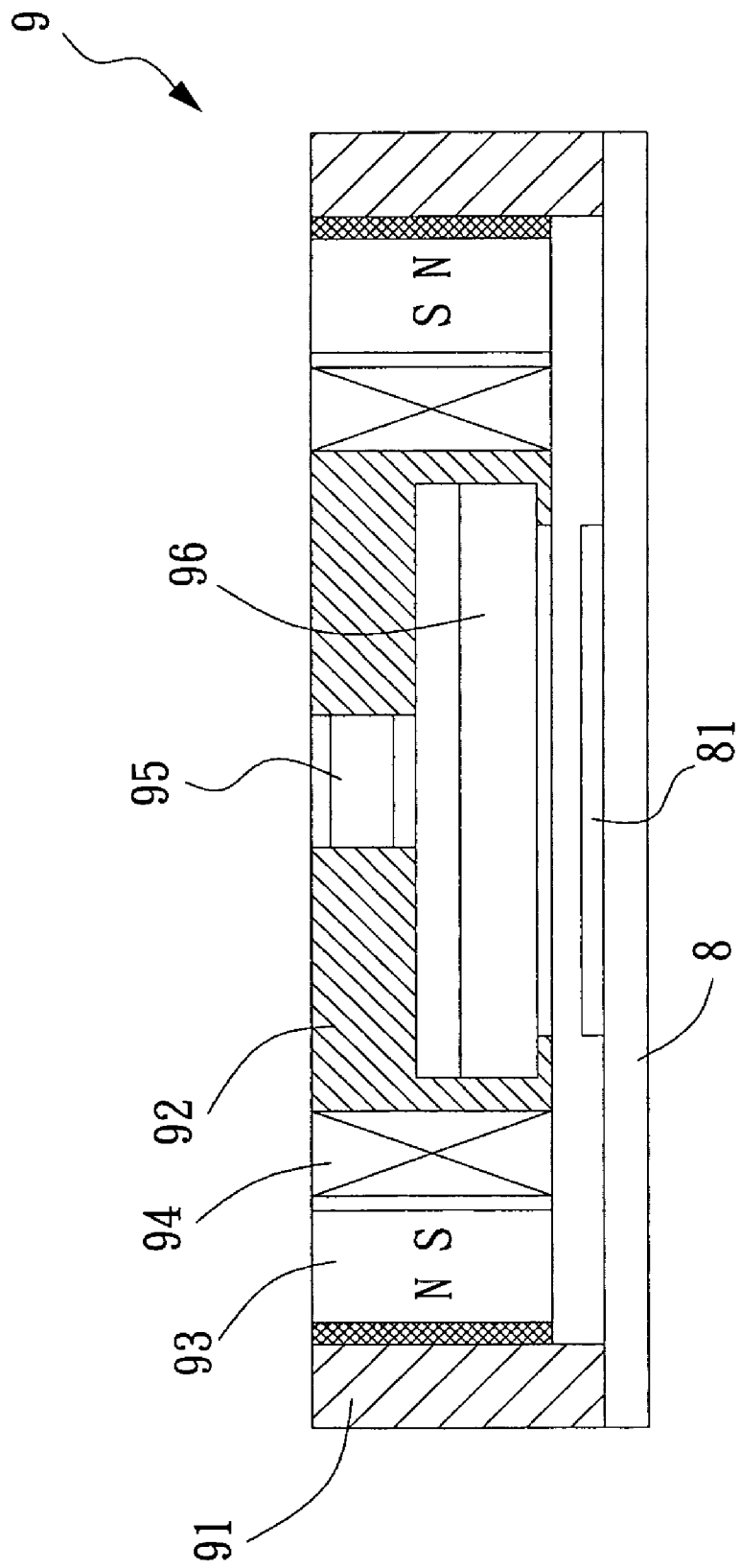
FIG. 1 is a schematic view of the structure of a conventional miniature lens module.
Figure 2:
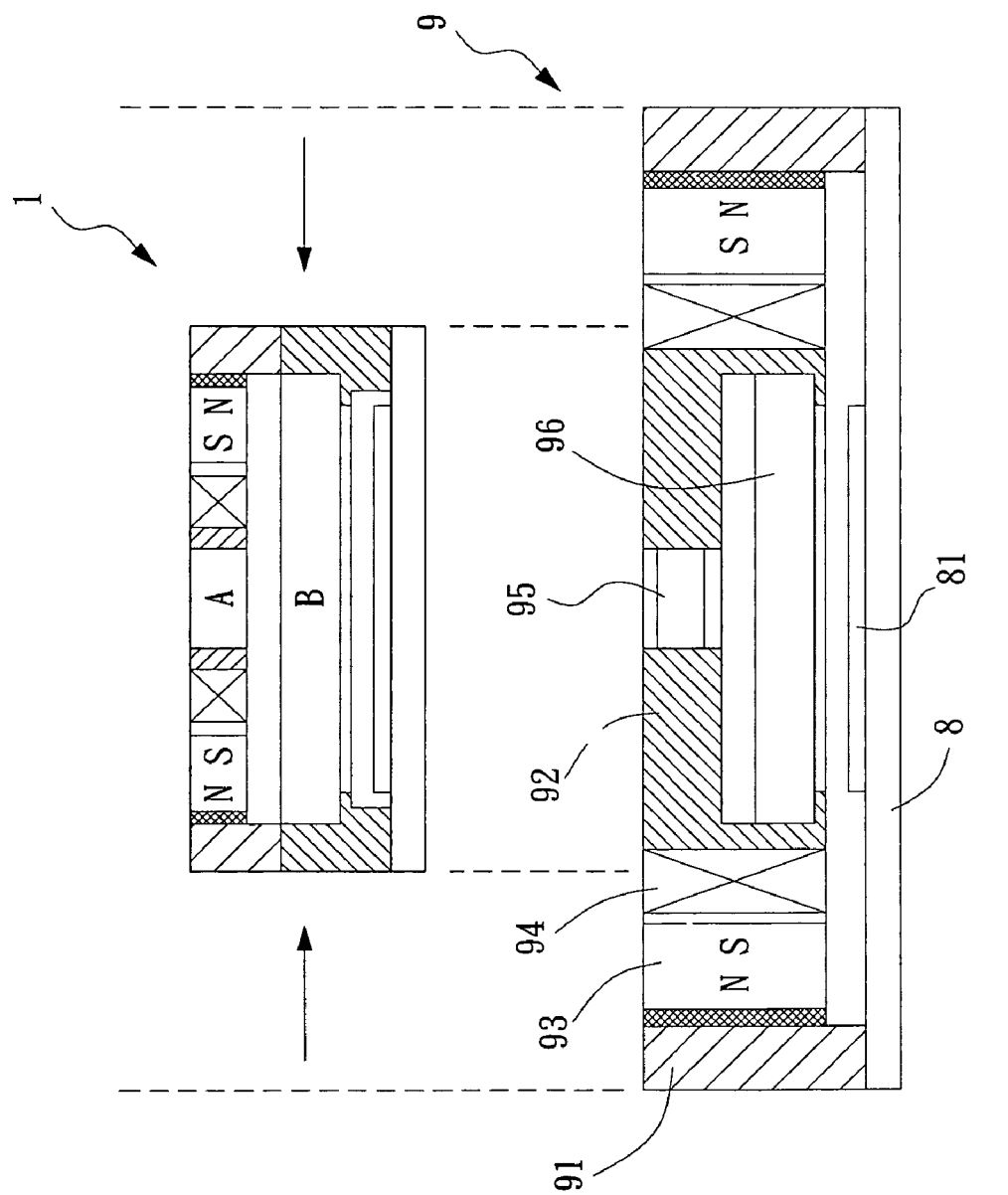
FIG. 2 is a schematic view of comparing a miniature auto-focusing lens device of the present invention with the conventional miniature lens module shown in FIG. 1 in terms of dimensions and size.

Referring to FIG. 2, there is shown a schematic view of comparing a miniature auto-focusing lens device 1 of the present invention with the conventional miniature lens module 9 shown in FIG. 1 in terms of dimensions and size. As shown in the drawing, given the same dimensions of the first lens 95 and the second lens 96, a VCM electromagnetic driving module is installed on a small optical lens set A but not on a large optical lens set B, and thus the drive coil 94 and the magnets 93 do not add to the overall volume of the miniature auto-focusing lens device 1 of the present invention. By contrast, the drive coil 94 and the magnets 93 of the conventional miniature lens module 9 encircle the first and second lenses 95, 96 and thus add to the overall volume of the conventional miniature lens module 9. Furthermore, the VCM electromagnetic driving module is installed only on the small optical lens set A of the miniature auto-focusing lens device 1 of the present invention, and thus it takes less magnetic force to drive the miniature auto-focusing lens device 1 to perform auto-focusing. Hence, not only is the miniature auto-focusing lens device 1 power-saving, but the miniature auto-focusing lens device 1 may be driven by the magnets 93 and the drive coil 94 which are relatively compact and lightweight.

Figure 3:
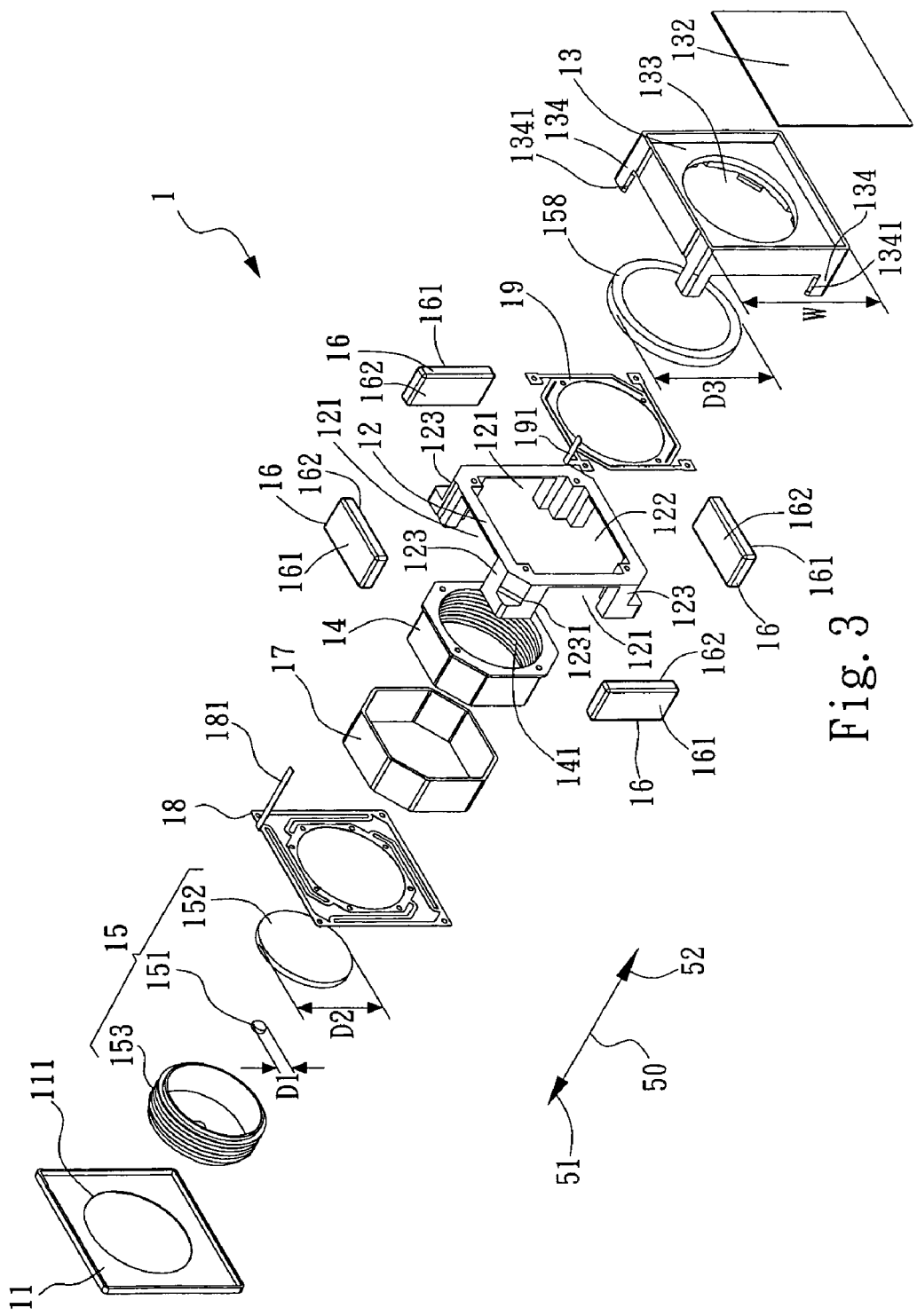
FIG. 3 is an exploded perspective view of a miniature auto-focusing lens device in a first embodiment according to the present invention.
Figure 4:
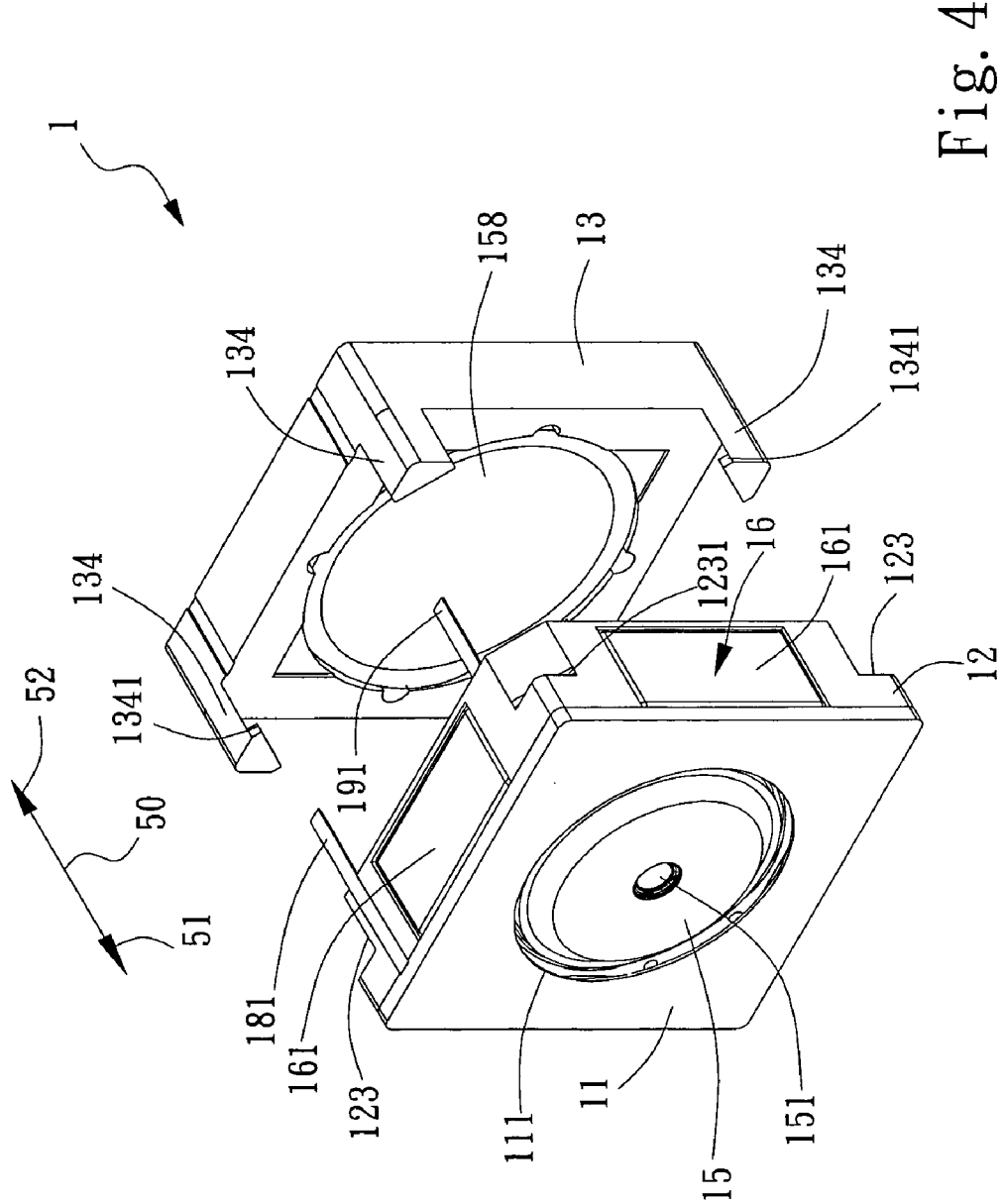
FIG. 4 is a partial assembly view of the miniature auto-focusing lens device in the first embodiment according to the present invention.
Figure 5:
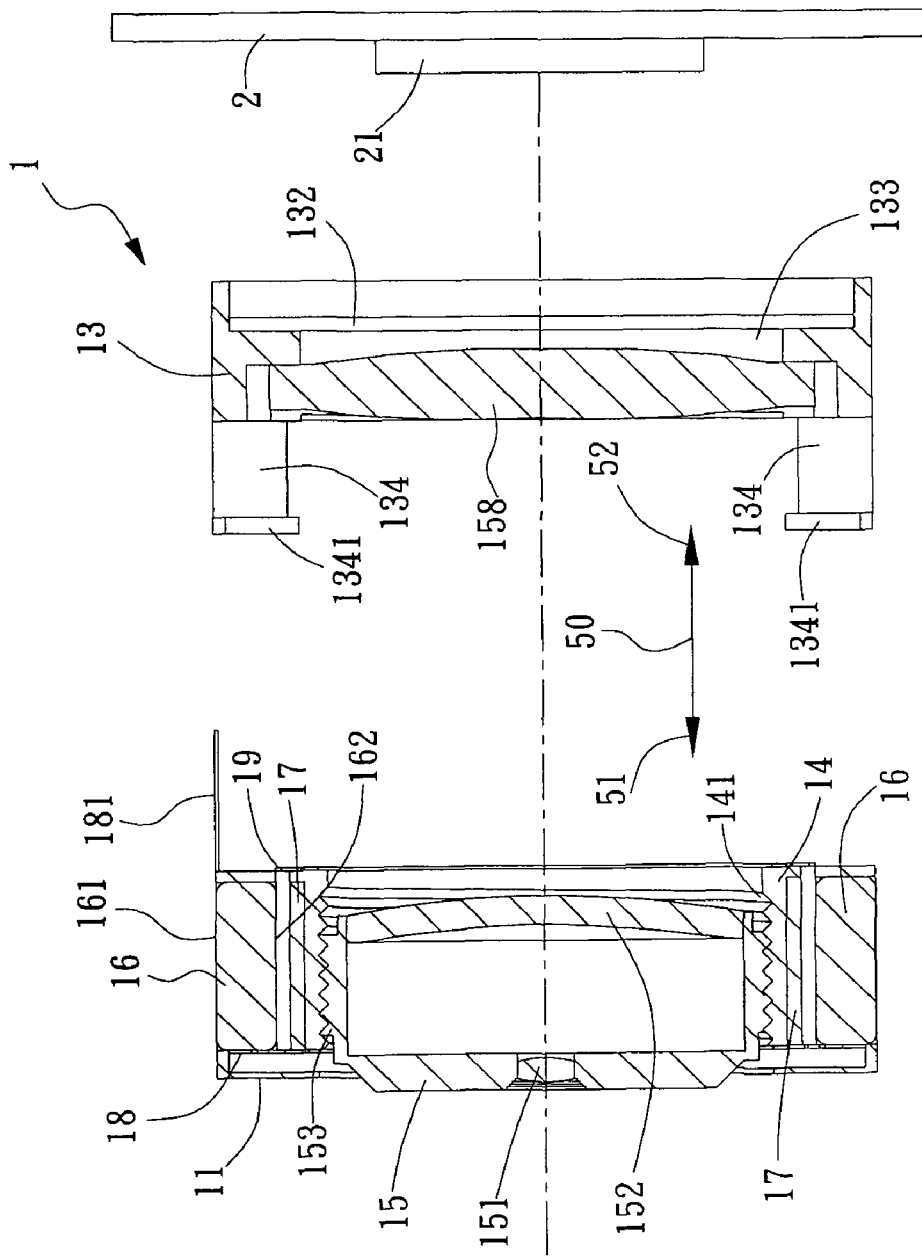
FIG. 5 is an exploded cross-sectional view of the miniature auto-focusing lens device in the first embodiment according to the present invention.

Referring to FIG. 3, FIG. 4, and FIG. 5, there are shown diagrams of the miniature auto-focusing lens device 1 in a first embodiment according to the present invention. The miniature auto-focusing lens device 1 is defined with a central axis 50 and comprises a lid 11, a first casing 12, a second casing 13, a lens carrier 14, a movable lens set 15, a plurality of magnets 16, a drive coil 17, a first conductive leaf spring 18, and a second conductive leaf spring 19. The central axis 50 is characterized by a forward direction 51 and a backward direction 52.

The lid 11 is coupled to an end of the first casing 12. The other end of the first casing 12 is coupled to the second casing 13. The lid 11 is centrally formed with a through hole 111 corresponding in position to the movable lens set 15, so as to enable the movable lens set 15 to capture external images. The first casing 12 is peripherally provided with a plurality of fixing frames 121. A receiving space 122 is formed between the lid 11 and a central portion of the first casing 12 and configured to receive the lens carrier 14. The fixing frames 121 of the first casing 12 are paired and opposite so as to enable the magnets 16 to be coupled to the first casing 12 from inside. The magnets 16 are capable of dipole magnetization or monopole magnetization.

The second casing 13 is provided with a fixed lens set 158 and a filter 132 and centrally formed with a penetrating hole 133. The second casing 13 is configured to be coupled to a circuit board 2. Through the penetrating hole 133, the fixed lens set 158 and an image sensing module 21 electrically connected to the circuit board 2 correspond in position to each other and are aligned with the central axis 50. The filter 132 provided for the second casing 13 is disposed above the image sensing module 21 such that images focused by the movable lens set 15 and the fixed lens set 158 pass through the filter 132 before being projected to the image sensing module 21. In other words, the optical system of the miniature auto-focusing lens device 1 of the present invention comprises the movable lens set 15 and the fixed lens set 158 which together perform optical focusing and imaging.

The second casing 13 is peripherally provided with at least a pair of male fastening members 134 equidistantly spaced apart from each other and opposite to each other. The first casing 12 is peripherally provided with at least a pair of female fastening members 123 corresponding in position to the paired male fastening members 134, respectively. A hook 1341 protruding from each of the male fastening members 134 is engaged with a groove 1231 provided on each of the female fastening members 123 to thereby allow firm engagement between the second casing 13 and the first casing 12. The lid 11, the first casing 12, and the second casing 13 are substantively equal in dimensions. In an embodiment of the present invention, the maximum width W of the miniature auto-focusing lens device 1 is less than 15 mm, and the first casing 12 substantively equals the second casing 13 in maximum dimensions. The optimal dimensions of width, length and height of the first casing 12 and the second casing 13 range between 5 mm and 13 mm.

The lens carrier 14 is disposed in the receiving space 122 and corresponds in position to the fixed lens set 158 mounted on the second casing 13. The drive coil 17 encircles the lens carrier 14. The drive coil 17 and the magnets 16 provided inside the fixing frames 121 peripherally provided to the first casing 12 correspond in position to each other but are separated from each other by a preset gap. Electric current is supplied to the drive coil 17 to change the directions of lines of magnetic force, and in consequence repulsive force or attractive force between the drive coil 17 and the magnets 16 is produced. As a result, the lens carrier 14 undergoes axial displacement in the forward direction 51 or the backward direction 52 of the central axis 50 within the receiving space 122 to thereby enable auto-focusing operation to take place therein. In other words, the magnets 16 and the drive coil 17 substantively form a VCM electromagnetic driving module for generating sufficient electromagnetic force to drive the lens carrier 14 and the movable lens set 15 therein to move.

The movable lens set 15 is centrally disposed in the lens carrier 14 and circumferentially provided with a plurality of external threads 153 in screw-engagement with a plurality of internal threads 141 provided on the circumferential inner wall of the lens carrier 14 to thereby allow synchronous displacement of the movable lens set 15 and the lens carrier 14, and in consequence two lenses 151, 152 of the movable lens set 15 and a lens of the fixed lens set 158 mounted on and fixed to the second casing 13 are aligned with the central axis 50 to enable precise focusing.

The movable lens set 15 is circumferentially provided with the external threads 153 in screw-engagement with the internal threads 141 provided on the circumferential inner wall of the lens carrier 14. The screw-engagement assembly process of the external threads 153 and the internal threads 141 is accompanied by inevitable production of traces of dust and microparticles. Dust and microparticles in the vicinity of the image sensing module 21 have a great impact on image quality. With the fixed lens set 158 separating the image sensing module 21 from the lens carrier 14, dust and microparticles which originate from an assembly process land on the surface of the fixed lens set 158 rather than the sensing surface of the image sensing module 21. Hence, the accumulated dust and microparticles are too far from the image sensing module 21 to have any impact on image quality. Accordingly, compared with the prior art, the miniature auto-focusing lens device 1 of the present invention is advantageously characterized by enhance image quality.

In the first embodiment of the miniature auto-focusing lens device 1 of the present invention, the movable lens set 15 comprises a first lens 151 and a second lens 152. The second lens 152 is positioned between the first lens 151 and the fixed lens set 158. The area A3 covered by the fixed lens set 158 is larger than the area covered by the second lens 152, and the area A2 covered by the second lens 152 is larger than the area A1 covered by the first lens 151, with A3>A2>A1. It is not necessary for the fixed lens set 158 which covers the largest area A3 to be peripherally provided with any magnets or coils, and thus the ratio of the diameter D3 of the fixed lens set 158 to the maximum width W of the miniature auto-focusing lens device 1 of the present invention (that is, the maximum width of the second casing 13) increases to 0.8 or above (that is, D3/W>0.8). In addition, in the first embodiment, the overall diameter (or width) of the lens carrier 14 and the drive coil 17 encircling the lens carrier 14 is slightly less than or approximate to the diameter D3 of the fixed lens set 158.

The magnets 16 each have an upper surface 161 and a lower surface 162 of opposite polarity (pole N or pole S). With the lower surfaces 162 of the same polarity (pole N or pole S) and the upper surfaces 161 of the same polarity (pole N or pole S), the magnets 16 are embedded in and fixed to the fixing frames 121 encircling the lens carrier 14 in such a manner that the magnets 16 are equidistantly spaced apart from each other. The lower surfaces 162 of the magnets 16 are separated from the drive coil 17 encircling the lens carrier 14 by a preset distance. Owing to their preset polarity (pole N or pole S), the lower surfaces 162 of the magnets 16 can be magnetically attracted to or can magnetically repel the drive coil 17 encircling the lens carrier 14.

The first conductive leaf spring 18 is sandwiched between the lid 11 and the first casing 12. The second conductive leaf spring 19 is sandwiched between the first casing 12 and the second casing 13. In the first embodiment of the present invention, the first conductive leaf spring 18 and the second conductive leaf spring 19 are two resilient metal sheets whereby the lens carrier 14 is resiliently clamped inside the receiving space 122 of the first casing 12. At least two pins 181, 191 extend from the first conductive leaf spring 18 and the second conductive leaf spring 19, respectively, and serve as the inputs for receiving positive and negative electric current such that the first and second conductive leaf springs 18, 19 are electrically connected to the drive coil 17, thereby changing the direction of the electric field of the drive coil 17, allowing the lens carrier 14 to undergo axial displacement in the forward direction 51 or the backward direction 52 within the receiving space 122 of the first casing 12, and eventually enabling the miniature auto-focusing lens device 1 to perform focusing.

Constituent elements of the miniature auto-focusing lens device 1 in the other preferred embodiments described below are mostly identical or similar to that in the aforesaid preferred embodiment. Hence, the same elements and structures are not repeatedly described hereunder. Like elements are named and numbered alike hereunder. Likewise, similar elements are named alike but each denoted with the original reference numeral followed by the letter 'a' or 'b' for distinction. Like elements and similar elements are not described hereunder.

Figure 6:
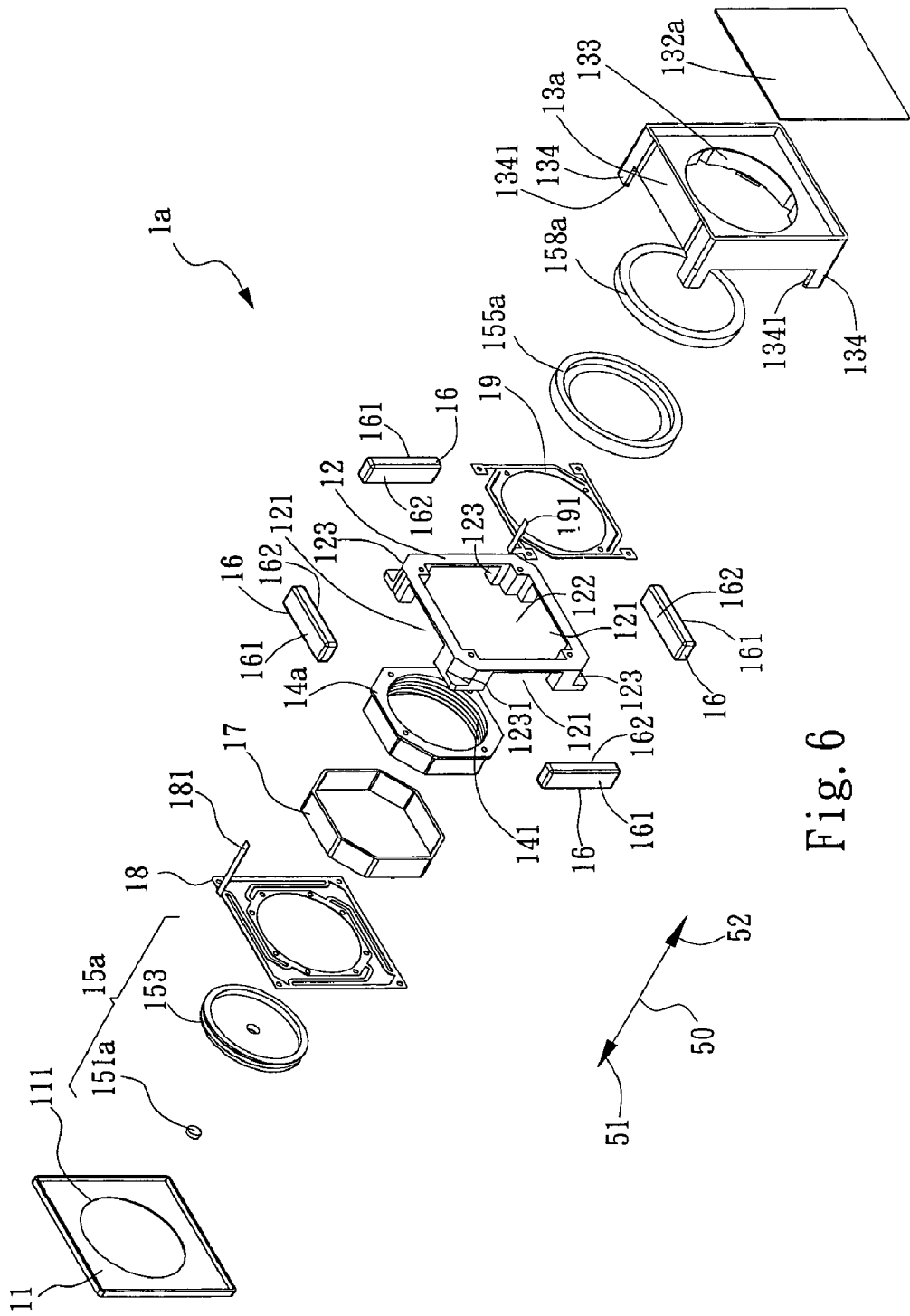
FIG. 6 is an exploded perspective view of the miniature auto-focusing lens device in a second embodiment according to the present invention.
Figure 7:
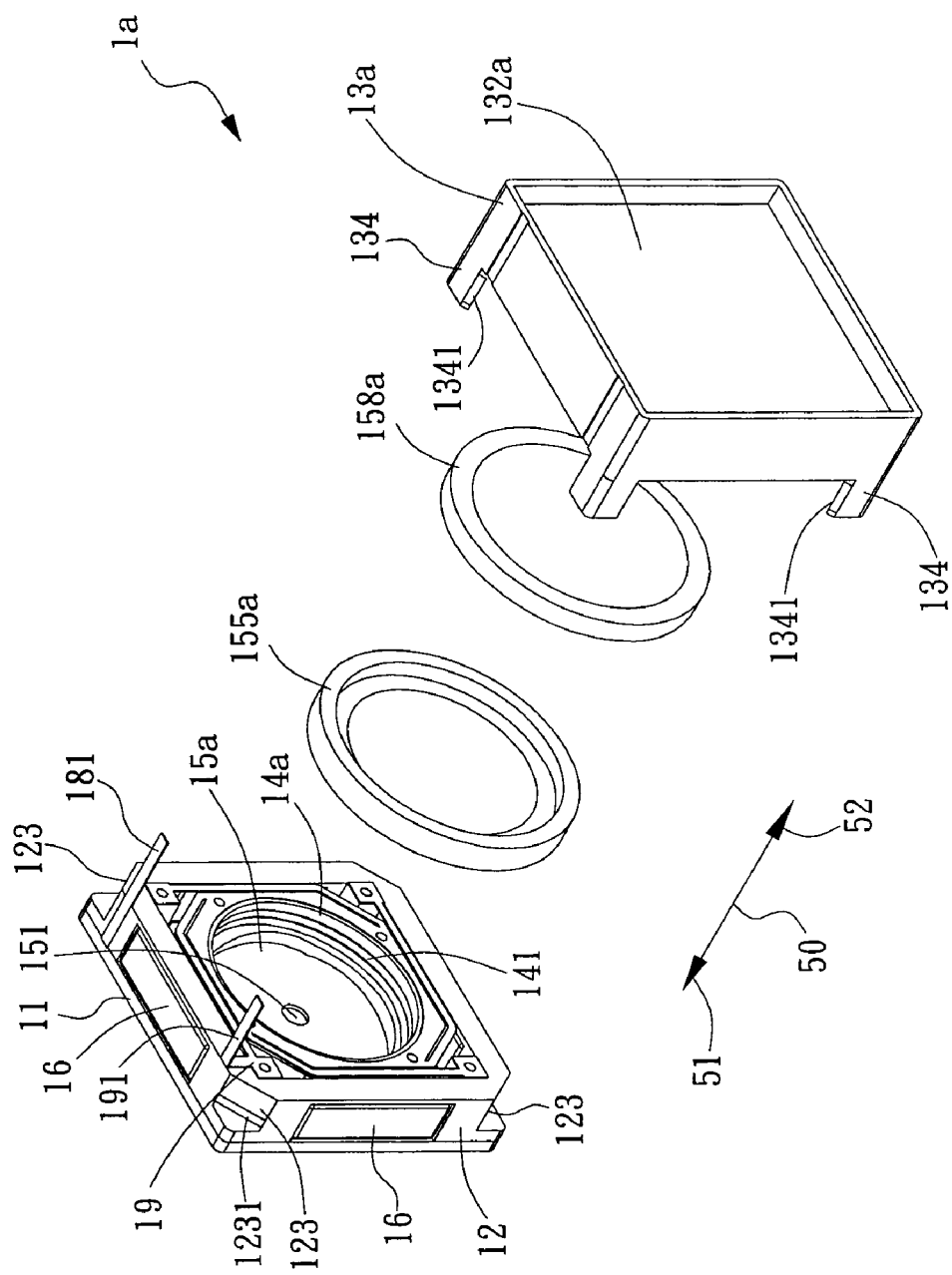
FIG. 7 is a partial assembly view of the miniature auto-focusing lens device in the second embodiment according to the present invention.

Referring to FIG. 6 and FIG. 7, there are shown diagrams of the miniature auto-focusing lens device 1a in a second embodiment according to the present invention. As shown in the drawings, a miniature auto-focusing lens device 1a in the second embodiment differs from the miniature auto-focusing lens device 1 in the first embodiment in that, in the second embodiment, a movable lens set 15a includes only a first lens 151a to render a lens carrier 14a and the movable lens set 15a therein together relatively lightweight, and thus the miniature auto-focusing lens device 1a is less loaded but more power-efficient during a focusing operation.

Two lenses 155a, 158a together form a fixed lens set mounted on a second casing 13a. Two said lens 155a, 158a are mounted on and fixed to the second casing 13a. Images focused by the first lens 151a of the movable lens set 15a and two said lens 155a, 158a of the fixed lens set pass through a filter 132a before being projected to the image sensing module 21 provided on a substrate 2. Two said lens 155a, 158a are substantively equal in diameter.

Figure 8:
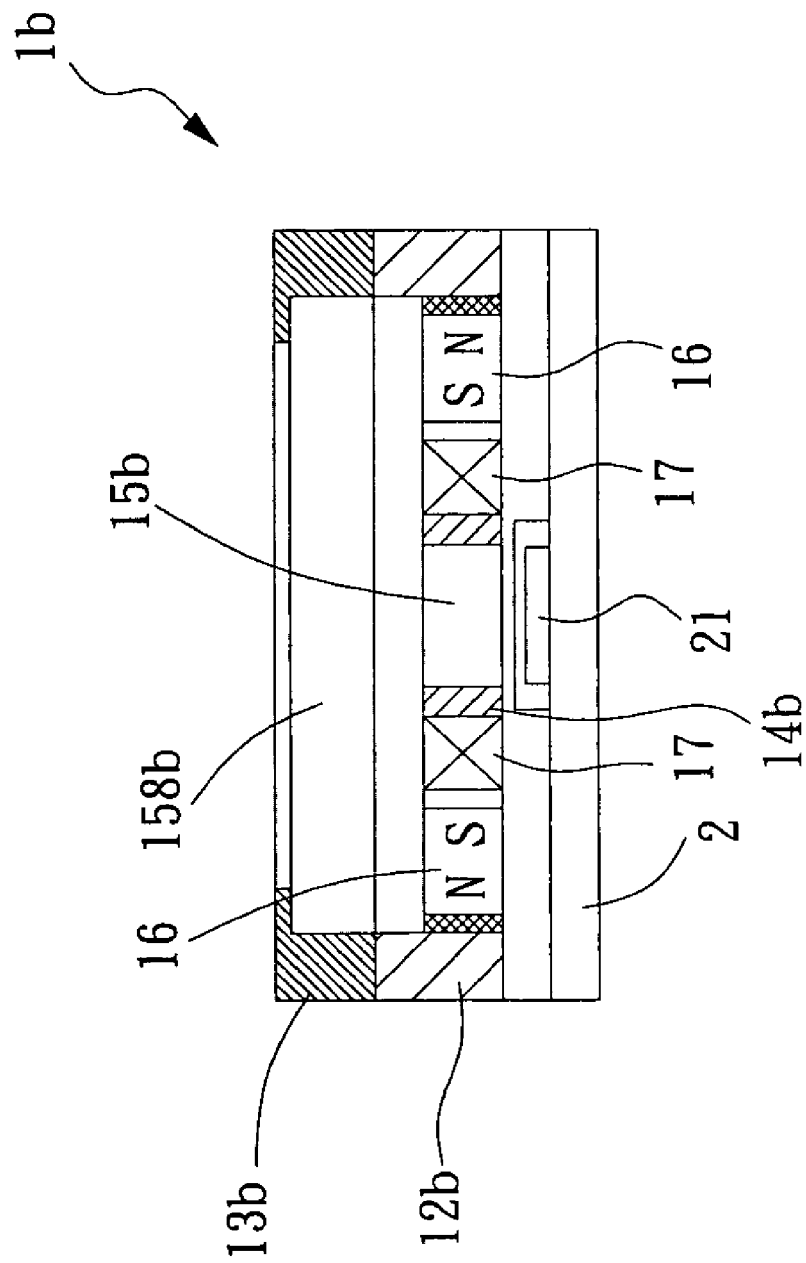
FIG. 8 is a schematic view of the structure of the miniature auto-focusing lens device in a third embodiment according to the present invention.

Referring to FIG. 8, a miniature auto-focusing lens device 1b in a third preferred embodiment of the present invention differs from the miniature auto-focusing lens device 1a in the second embodiment and the miniature auto-focusing lens device 1 in the first embodiment of the present invention as follows. A first casing 12b is coupled to the substrate 2 such that a movable lens set 15b disposed in a lens carrier 14b received in the receiving space corresponds in position to the image sensing module 21, and thus the movable lens set 15b and the image sensing module 21 are aligned with the central axis 50. A second casing 13b faces in the forward direction 51 of the central axis 50 so as for a fixed lens set 158b in the second casing 13b to capture external images. In other words, the movable lens set and the fixed lens set in the third embodiment illustrated with FIG. 8 are positioned in a way opposite to the disclosure in the first and second embodiments.

The present invention has been described with preferred embodiments thereof, and it is understood that many changes and modifications to the described embodiment can be carried out without departing from the scope and the spirit of the invention that is intended to be limited only by the appended claims.

What is claimed is:

1. A miniature auto-focusing lens device, defined with a central axis and comprising:
    at least a casing provided therein with a receiving space;
    a movable lens set comprising at least a lens and disposed in the receiving space;
    an electromagnetic driving module provided in the receiving space and configured to drive the movable lens set to perform focusing and displacement;
    a fixed lens set comprising at least a lens and corresponding in position to the movable lens set;
    an image sensing module provided in the receiving space for receiving images focused by the movable lens set and the fixed lens set, constructed on and electrically connected to a circuit board;
    wherein the movable lens set, the fixed lens set and the image sensing module are arranged in the receiving space with the fixed lens set between the movable lens set and the image sensing module;
    wherein the movable lens set and the fixed lens set together form an optical system of the miniature auto-focusing lens device so as to perform optical focusing and imaging, and the at least a lens of the fixed lens set is of dimensions larger than any one of the at least a lens of the movable lens set;
    wherein the casing comprises a first casing and a second casing, the receiving space being provided in the first casing, the movable lens set and electromagnetic driving module being disposed in the receiving space of the first casing, while the fixed lens set being provided in the second casing, and a maximum width of the first casing and the second casing being less than 15 mm;
    wherein the miniature auto-focusing lens device further comprises a lens carrier configured to carry the movable lens set therein and provided, internally and circumferentially, with a plurality of internal threads in screw-engagement with a plurality of external threads circumferentially provided on the movable lens set; and
    wherein the first casing is peripherally provided with a plurality of fixing frames paired, opposite, and equidistantly spaced apart from each other, and the electromagnetic driving module comprises a plurality of magnets and a drive coil, the magnets being embedded in and fixed to the fixing frames peripherally provided to the first casing, and the drive coil encircling the lens carrier and being separated from the magnets provided inside the fixing frames by a preset gap.

2. The miniature auto-focusing lens device of claim 1, wherein the movable lens set further comprises a first lens and a second lens positioned between the first lens and the fixed lens set and having a diameter larger than a diameter of the first lens.

3. The miniature auto-focusing lens device of claim 1, wherein surfaces and drive coil-facing surfaces of the magnets provided in the first casing are of a same polarity, the same polarity being one of pole N and pole S, the first casing having a pair of female fastening members; and wherein the second casing is peripherally provided with at least a pair of male fastening members equidistantly spaced apart from each other and opposite to each other, the female fastening members of the first casing corresponding in position to pair the male fastening members, each of the male fastening member having a protruding hook to engage with a groove provided on each of the respective female fastening members to thereby allow firm engagement between the second casing and the first casing.

4. The miniature auto-focusing lens device of claim 1, wherein the second casing is coupled to the circuit board.

5. The miniature auto-focusing lens device of claim 4, wherein the second casing is provided with a filter disposed between the fixed lens set and the image sensing module on the circuit board and corresponding in position to the image sensing module.

6. The miniature auto-focusing lens device of claim 1, further comprising a lid coupled to the first casing and centrally provided with a through hole corresponding in position to the movable lens set and opposing to the circuit board with respect to the casing.

7. The miniature auto-focusing lens device of claim 6, further comprising a first conductive leaf spring sandwiched between the lid and the first casing and a second conductive leaf spring sandwiched between the first casing and the second casing, wherein the first and second conductive leaf springs are configured to enable the lens carrier to be resiliently clamped inside the receiving space of the first casing and are electrically connected to the drive coil.

8. The miniature auto-focusing lens device of claim 7, wherein at least two pins extend from the first conductive leaf spring and the second conductive leaf spring, respectively, and serve as inputs for receiving positive and negative electric current.

9. The miniature auto-focusing lens device of claim 1, wherein the movable lens set includes only one lens, and the fixed lens set includes two lenses, said two lenses of fixed lens set being mounted on the second casing.

* * * * *